Sept. 7, 1965   E. H. BUCK   3,205,438
PHASE DETECTOR EMPLOYING BISTABLE CIRCUITS
Filed Jan. 22, 1962   2 Sheets-Sheet 1

Edwin H. Buck
INVENTOR.

BY Richard E. Bee
ATTORNEY

Sept. 7, 1965  E. H. BUCK  3,205,438
PHASE DETECTOR EMPLOYING BISTABLE CIRCUITS
Filed Jan. 22, 1962  2 Sheets-Sheet 2
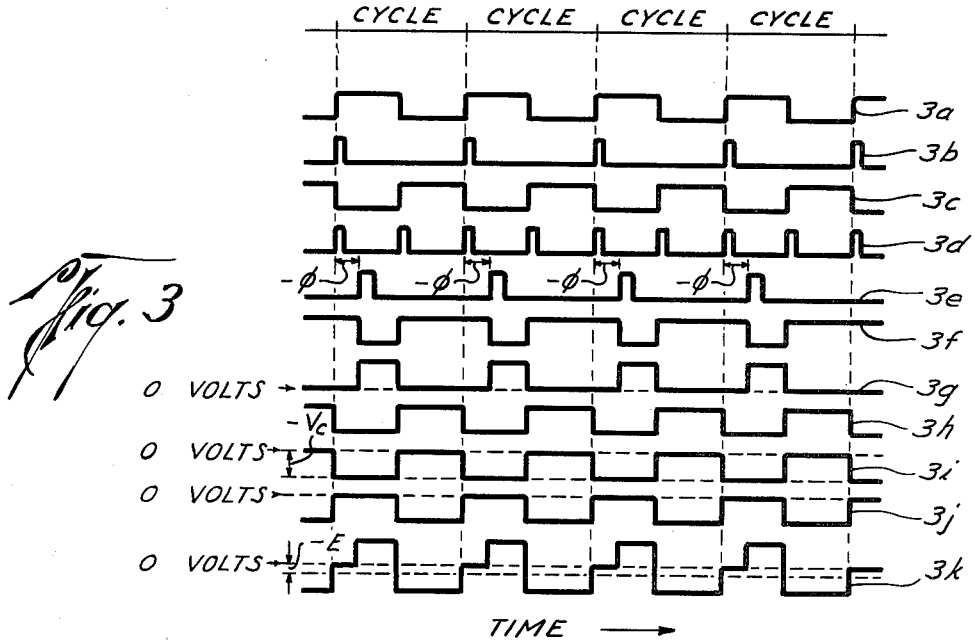
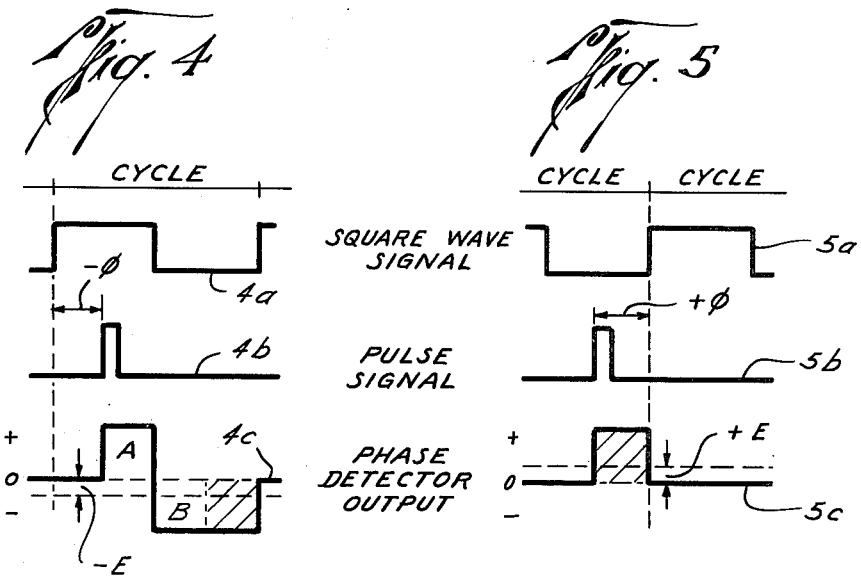
Edwin H. Buck
INVENTOR.
BY Richard E. Bee
ATTORNEY

United States Patent Office 3,205,438
Patented Sept. 7, 1965

3,205,438
PHASE DETECTOR EMPLOYING BISTABLE
CIRCUITS
Edwin H. Buck, Sarasota, Fla., assignor to Electro-Mechanical Research, Inc., Sarasota, Fla., a corporation of Connecticut
Filed Jan. 22, 1962, Ser. No. 167,503
5 Claims. (Cl. 324—83)

This invention relates to phase detectors and, particularly, to phase detectors of the type which are useful in automatic phase control loops and phase-locked loops.

Various types of phase detectors have been heretofore proposed for comparing two input signals and developing an output signal which is representative of the phase difference between the two input signals. In general, these previously-proposed phase detectors suffer from one or more of the following deficiencies: (1) insufficient linearity, (2) insufficient sensitivity (volts per degree phase difference), or (3) insufficient operating range. The seriousness of these deficiencies depends on the particular use to which the phase detector is being put and upon the particular types of signals being compared.

A frequent and important use of phase detectors is in automatic phase control loops or phase-locked loops. In these loops, the phase detector is used to compare the signal received from a remote location with the signal generated by a nearby local oscillator circuit. The output from the phase detector is representative of frequency and phase differences between the two signals. This output signal is used to adjust the frequency and phase of the local oscillator circuit so as to bring the local oscillator signal into frequency and phase synchronism with the signal received from the remote location. In this application, the sensitivity and range of the phase detector are particularly important and many of the previously-proposed phase detectors do not provide entirely satisfactory operation wherein either the nature of the signals or the requirements of the particular application are very demanding.

Another feature which is sometimes objectionable in such phase control loops is that previously-proposed phase detectors usually require that the two input signals must differ in phase by a prescribed amount in order to produce the minimum output signal which is indicative of the existence of synchronism between the two input signals. In other words, the two signals may be running in step with one another, but a fixed phase shift, such as 90°, will exist between the two signals.

It is an object of the invention, therefore, to provide a new and improved phase detector which avoids one or more of the foregoing limitations of phase detectors heretofore proposed.

It is another object of the invention to provide a new and improved phase detector having a more linear input-output characteristic.

It is an additional object of the invention to provide a new and improved phase detector of increased sensitivity (volts/degree).

It is a further object of the invention to provide a new and improved phase detector having a wider operating range.

In accordance with the invention, a phase detector for comparing a pair of input signals for determining differences in timing therebetween comprises a first bistable circuit which is set to one of its stable states by a first of the input signals and to the other of its stable states by the second of the input signals. The phase detector also includes circuit means for comparing the alternations of the first bistable circuit with one of the input signals for producing a control signal when one of the input signals bears a predetermined timing relation to the other of the input signals. The phase detector further includes a second bistable circuit which is set to one of its stable states by the control signal and to the other of its stable states by one of the input signals. The phase detector additionally includes circuit means coupled to the two bistable circuits for producing an output signal component having a polarity and a magnitude with respect to a predetermined reference level which is representative of the direction and magnitude of differences in timing between the two input signals.

For a better understanding of the present invention, together with other and further objects thereof, reference is had to the following description taken in connection with the accompanying drawings, the scope of the invention being pointed out in the appended claims.

Referring to the drawings:

FIGS. 3–5 are timing diagrams used in explaining the operation of the phase detector of FIG. 1.

Figure 1:
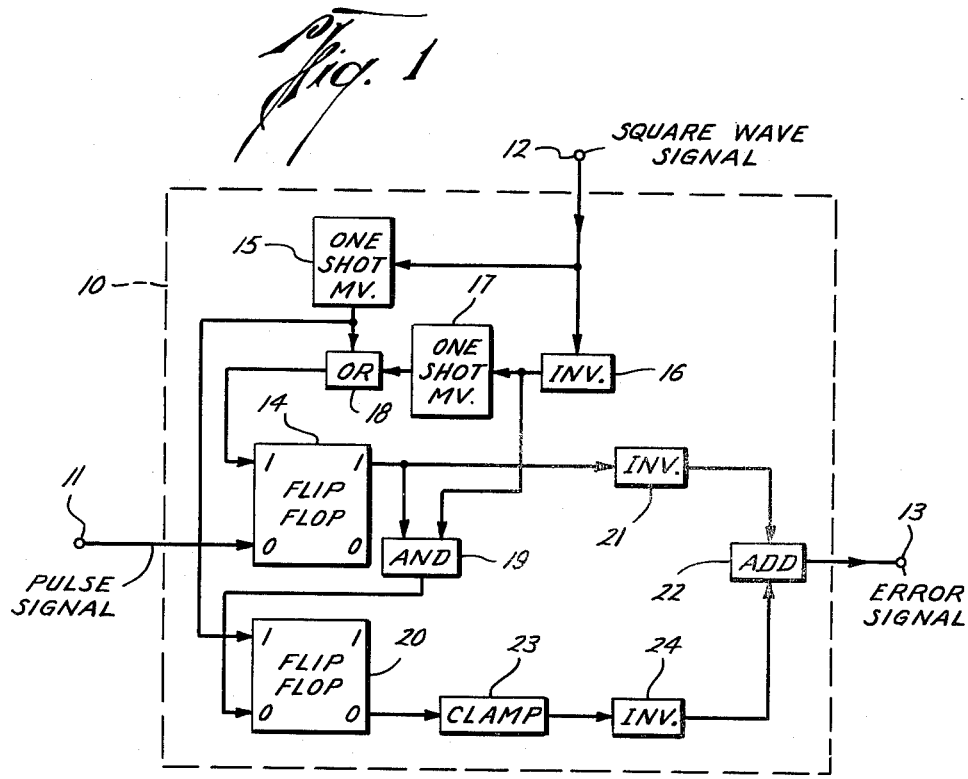
FIG. 1 is a block diagram of a representative embodiment of a phase detector constructed in accordance with the present invention.
Figure 2:
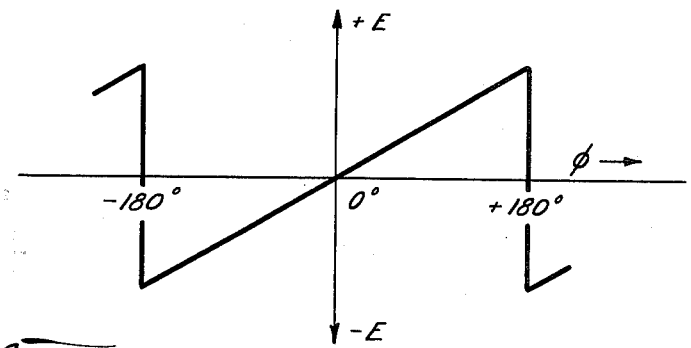
FIG. 2 is a graph showing the input-output characteristic of the phase detector of FIG. 1.

Referring now to FIG. 1 of the drawings, there is shown a representative embodiment of a phase detector 10 constructed in accordance with the present invention. For purposes of explaining the invention, it is assumed that the phase detector 10 is comparing a pulse signal with a square-wave signal. To this end, a pulse signal is supplied to a first input terminal 11 of the phase detector 10, while a square-wave signal is supplied to a second input terminal 12. The phase detector 10 serves to compare these two input signals and to develop at an output terminal 13 a direct-current error signal (E) which is proportional to any phase difference ($\phi$) between the two input signals. The input-output characteristic for the phase detector 10 is shown in FIG. 2. As there seen, the error signal may be either polarity depending upon the direction of the phase difference or, in other words, the relative direction of any difference in timing between the two input signals.

Considering the details of the FIG. 1 embodiment, the phase detector 10 includes a first bistable circuit which takes the form of a flip-flop circuit 14. In order to set this flip-flop circuit 14 to its "one" state, the square-wave signal at input terminal 12 is supplied to a one-shot multivibrator 15 and to an inverter circuit 16. The square-wave signal itself is represented by waveform 3a of FIG. 3. The positive-going transitions in this square-wave signal are effective to trigger the one-shot multivibrator 15. Each time the multivibrator 15 is triggered, it produces a relatively narrow output pulse. Typical ones of these pulses are represented by waveform 3b of FIG. 3. The inverted square-wave signal at the output of inverter 16 is represented by waveform 3c. The positive-going transitons in this inverted signal are used to trigger a second one-shot multivibrator 17. Each time the multivibrator 17 is triggered, it produces a relatively narrow output pulse. These output pulses are supplied to an OR circuit 18. The output pulses from the first multivibrator 15 are also supplied to the OR circuit 18. OR circuit 18 serves to combine these two sets of pulses to produce at its output a composite pulse train as represented by waveform 3d. This composite pulse train is supplied to the "one" side input of the flip-flop circuit 14. Consequently, the flip-flop circuit 14 is set to the "one" state twice each cycle of the square-wave signal.

The pulse signal supplied to the input terminal 11 of the phase detector 10 is supplied to the "zero" side input of the flip-flop circuit 14. A typical pulse signal appearing at the input terminal 11 is represented by waveform 3e of FIG. 3. Each of these pulses is effective to set the flip-flop 14 to the "zero" state. If these signal pulses are exactly in phase with the square-wave signal, then their leading edges coincide with the positive-going transitions in the square-wave signal. For the moment, it is assumed that the leading edges of the pulses making up the pulse signal lag behind the positive-going transitions in the square-wave signal. This is the case illustrated in FIG. 3 where the phase difference is indicated as being $-\phi$. The resulting waveform appearing at the "one" side output of flip-flop 14 is represented by waveform 3f. In effect, each signal pulse (waveform 3e) drives this output waveform to a "zero" level when it sets the flip-flop 14 to the "zero" state, the output subsequently returning to the "one" level upon the occurrence of the next pulse from the OR circuit 18 (waveform 3d). It then remains at the "one" level until the occurrence of the next signal pulse.

The phase detector 10 also includes a circuit for comparing the output of flip-flop 14 with the inverted replica of the square-wave signal appearing at the output of inverter 16. This produces a control signal for the case where the signal pulse occurs during the first half of the square-wave signal cycle. This comparing function is performed by a two-input AND circuit 19. The logic of AND circuit 19 is such that it will produce a "zero" level output whenever the two inputs thereof are at the "zero" level. Otherwise, its output will remain at a "one" level. Note that the "zero" level referred to is a binary zero level and not necessarily a zero voltage level. AND circuit 19 will produce an output for the case illustrated in FIG. 3. As indicated by waveform 3f, the output of flip-flop 14 goes to a "zero" level during the first half of the square-wave cycle, during which time the inverted output from inverter 16 also goes to a "zero" level as indicated by waveform 3c. Thus, the output of AND circuit 19 goes to a "zero" level while the output of flip-flop 14 is at a "zero" level. Consequently, the output of AND circuit 19 can also be represented by waveform 3f. The positive-going transitions in this waveform are used as the control signals for indicating that the signal pulse is occurring during the first half of the square-wave cycles.

The control signals represented by the positive-going signal transitions at the output of AND circuit 19 are supplied to the "zero" side input of a second bistable circuit which is represented by a flip-flop circuit 20. Each of these control signals will set the flip-flop 20 to the "zero" state. The pulses derived from the square-wave signal and appearing at the output of multivibrator 15 are supplied to the "one" side input of flip-flop 20. Thus, as seen from waveform 3f, the flip-flop 20 will be set to the "zero" state at the halfway point in each square-wave cycle. It is then returned to the "one" state by the next occurring pulse at the output of multivibrator 15 (waveform 3b). Thus, flip-flop 20 will be returned to the "one" state at the beginning of each square-wave cycle. The output waveform developed at the "zero" side output of flip-flop 20 is represented by waveform 3h of FIG. 3. It is at a binary "zero" level when the flip-flop 20 is in its "one" state and at a binary "one" level when the flip-flop 20 is in its "zero" state.

The phase detector 10 also includes circuit means coupled to the outputs of the two flip-flop circuits 14 and 20 for combining their output waveforms to produce a composite output signal for the phase detector 10. To this end, the output from flip-flop 14 (waveform 3f) is supplied to and inverted by an inverter circuit 21. The output of inverter 21 is represented by waveform 3g. At this point in the circuit, it is necessary that the lower binary signal level correspond to a predetermined reference voltage level. A voltage level of zero volts is assumed to be the reference voltage level. Thus, the lower of the two levels of waveform 3g is at a voltage level of zero volts. The output of inverter 21 is coupled to a first input of an adding circuit 22.

The output of flip-flop circuit 20 (waveform 3h) is supplied to a clamp circuit. This clamp circuit 23 serves to clamp the lower of the two levels in the flip-flop 20 output signal at a preliminary negative reference voltage level of $-V_c$ volts. The clamped output of clamp 23 is represented by waveform 3i. This clamp signal is supplied to and inverted by an inverter circuit 24. The output of inverter 24 is represented by waveform 3j. What was originally the lower of the two levels of the clamped signal is now the higher of the two signal levels and is at the zero reference voltage level. Thus, the preliminary reference level $-V_c$ is of such magnitude as to produce a zero voltage level at the output of inverter 24. The inverted signal is supplied to a second input of the adding circuit 22.

Adding circuit 22 serves to add or combine the two signals supplied thereto to produce a composite output signal as represented by waveform 3k. As there seen, the part contributed by the first flip-flop circuit 14 is of positive polarity while the part contributed by the second flip-flop circuit 20 is of negative polarity. The important feature of this composite signal is the value of its direct-current component. This direct-current component constitutes the error signal component which appears at the output terminal 13 and which represents the amount of phase difference between the pulse signal and the square-wave signal. In the present case, this direct-current component is of value $-E$ as indicated on waveform 3k.

The waveforms of FIG. 4 summarize in a concise manner the operation just discussed. As there indicated, when the signal pulse (waveform 4b) occurs during the first or positive half cycle of the square-wave signal (waveform 4a), the signal appearing at the output terminal 13 (waveform 4c) has both positive and negative components. The portion "A" represented by the positive component serves to cancel out a portion "B" corresponding to part of the negative component, leaving a net negative component which produces the negative error signal $-E$. As the signal pulse falls farther and farther behind the leading edge of the square-wave cycle, this direct-current component becomes more and more negative.

Considering now the other of the two possible cases, namely, the case where the signal pulse occurs during the last half of the square-wave cycle, the operation of the phase detector 10 is the same as before except that the AND circuit 19 no longer produces an output control signal. This is because the flip-flop 14 output signal goes to a zero level only at a time when the inverted signal at the output of inverter 16 is at the one level (waveform 3c). Thus, flip-flop 20 remains in the one state and, consequently, its "zero" side output remains at the binary "zero" level. This binary "zero" level is set at the negative clamping voltage level $-V_c$ by the clamp 23. This negative level is inverted by inverted 24 to a zero voltage level. Thus, flip-flop contributes nothing to the adding circuit 22. As a result, the output of adding circuit 22 contains only the positive-going pulse appearing at the output of inverter 21.

The operation in this case is concisely summarized by the waveforms of FIG. 5. As there indicated, when the signal pulse (waveform 5b) occurs during the last or negative half cycle of the square-wave signal (waveform 5a), the output of phase detector 10 contains only a positive polarity pulse (waveform 5c). The direct-current component ($+E$) of this output signal is of positive polarity and has a magnitude which is proportional to the amount by which the signal pulse leads the positive-going transition in the square-wave signal.

When the leading edges of the signal pulses just coincide with the positive-going transitions in the square-wave signal, then the direct-current error signal at the output of the phase detector 10 assumes a value of zero volts. This indicates that the phase difference is zero and that the pulse signal and the square-wave signal are exactly in phase with one another.

The phase detector 10 will also provide satisfactory operation where both input signals are of the square-wave type. In this case, the second square-wave signal would be applied to the input terminal 11. The flip-flop circuit 14 would only respond to the positive-going transitions in this square-wave signal and the operation would be the same as for the previous pulse type signal. The phase detector 10 will also operate with two sets of pulse type signals if a minor modification is made in the FIG. 1 circuit. In particular, it would be necessary to insert a one-shot multivibrator just ahead of the inverter circuit 16 and to construct this multivibrator so that the resulting output pulse would have a duration approximately equal to one-half the duty cycle of the pulses supplied to the input terminal 12.

While there has been described what is at present considered to be a preferred embodiment of this invention, it will be obvious to those skilled in the art that various changes and modifications may be made therein without departing from the invention, and it is, therefore, intended to cover all such changes and modifications as fall within the true spirit and scope of the invention.

What is claimed is:

1. A phase detector for comparing a pair of input signals for determining differences in timing therebetween comprising: a first bistable circuit which is set to one of its stable states by a first of the input signals and to the other of its stable states by the second of the input signals; circuit means for comparing the alternations of the first bistable circuit with one of the input signals for producing a control signal when one of the input signals bears a predetermined timing relation to the other of the input signals; a second bistable circuit which is set to one of its stable states by the control signal and to the other of its stable states by one of the input signals; and circuit means coupled to the two bistable circuits for producing an output signal component having a polarity and a magnitude with respect to a predetermined reference level which is representative of the direction and magnitude of differences in timing between the two input signals.

2. A phase detector for comparing a pair of input signals for determining differences in timing therebetween comprising: a first bistable circuit which is set to one of its stable states by a first of the input signals and to the other of its stable states by the second of the input signals; circuit means for comparing the alternations of the first bistable circuit with the second input signal for producing a control signal when the first input signal bears a predetermined one of a leading or lagging phase relationship relative to the second input signal; a second bistable circuit which is set to one of its stable states by the control signal and to the other of its stable states by the second input signal; and circuit means coupled to the two bistable circuits for producing an output signal component having a polarity and a magnitude with respect to a predetermined reference level which is representative of the direction and magnitude of differences in timing between the two input signals.

3. A phase detector for comparing a pulse signal and a square-wave signal for determining differences in timing therebetween comprising: a first bistable circuit which is set to one of its stable states by the pulse signal and to the other of its stable states by the square-wave signal; circuit means for comparing the alternations of the first bistable circuit with the square-wave signal for producing a control signal when the pulse signal occurs during a predetermined half of the square-wave cycle; a second bistable circuit which is set to one of its stable states by the control signal and to the other of its stable states by the square-wave signal; and circuit means coupled to the two bistable circuits for producing an output signal component having a polarity and a magnitude with respect to a predetermined reference level which is representative of the direction and magnitude of differences in timing between the pulse and square-wave signals.

4. A phase detector for comparing a pair of input signals for determining differences in timing therebetween comprising: a first bistable circuit which is set to one of its stable states by a first of the input signals and to the other of its stable states by the second of the input signals; circuit means for comparing the alternations of the first bistable circuit with one of the input signals for producing a control signal when one of the input signals bears a predetermined timing relation to the other of the input signals; a second bistable circuit which is set to one of its stable states by the control signal and to the other of its stable states by one of the input signals; and circuit means for combining signals obtained from the two bistable circuits for producing an output signal component having a polarity and a magnitude with respect to a predetermined reference level which is representative of the direction and magnitude of differences in timing between the two input signals.

5. A phase detector for comparing a pair of input signals for determining differences in timing therebetween comprising: a first bistable circuit which is set to one of its stable states by a first of the input signals and to the other of its stable states by the second of the input signals; circuit means for comparing the alternations of the first bistable circuit with one of the input signals for producing a control signal when one of the input signals bears a predetermined timing relation to the other of the input signals; a second bistable circuit which is set to one of its stable states by the control signal and to the other of its stable states by one of the input signals; circuit means coupled to the two bistable circuits for producing first and second output signals of opposite polarities relative to a predetermined reference level; and circuit means for adding these output signals for producing an output signal component having a polarity and a magnitude with respect to the predetermined reference level which is representative of the direction and magnitude of differences in timing between the two input signals.

References Cited by the Examiner

UNITED STATES PATENTS

| 2,795,695 | 6/57 | Raynsford | 328—133 |
| 2,866,092 | 12/58 | Raynsford | 328—133 X |
| 2,984,786 | 5/61 | Walker | 324—83 X |
| 3,013,211 | 12/61 | Garabedian | 328—133 X |
| 3,069,623 | 12/62 | Murgio | 328—134 X |

WALTER L. CARLSON, *Primary Examiner.*

FREDERICK M. STRADER, *Examiner.*